United States Patent
Jang et al.

(10) Patent No.: US 10,332,672 B2
(45) Date of Patent: Jun. 25, 2019

(54) HEAT RADIATION UNIT AND WIRELESS POWER TRANSMITTING AND RECEIVING DEVICE HAVING SAME

(71) Applicant: AMOGREENTECH CO., LTD., Gimpo-si (KR)

(72) Inventors: Kil Jae Jang, Seongnam-si (KR); Dong Hoon Lee, Yongin-si (KR); Seung Jae Hwang, Incheon (KR); Min Sik Chang, Gwacheon-si (KR); Hwi Chul Shin, Incheon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 51 days.

(21) Appl. No.: 15/538,041

(22) PCT Filed: Jan. 8, 2016

(86) PCT No.: PCT/KR2016/000167
§ 371 (c)(1),
(2) Date: Jun. 20, 2017

(87) PCT Pub. No.: WO2016/114528
PCT Pub. Date: Jul. 21, 2016

(65) Prior Publication Data
US 2017/0345555 A1 Nov. 30, 2017

(30) Foreign Application Priority Data
Jan. 12, 2015 (KR) .................. 10-2015-0004307
Jan. 12, 2015 (KR) .................. 10-2015-0004308

(51) Int. Cl.
*H01F 27/42* (2006.01)
*H01F 37/00* (2006.01)
(Continued)

(52) U.S. Cl.
CPC .......... *H01F 27/2876* (2013.01); *B32B 7/12* (2013.01); *B32B 15/04* (2013.01); *H01F 27/22* (2013.01);
(Continued)

(58) Field of Classification Search
CPC . H02J 5/005; H02J 7/025; H02J 17/00; H01F 38/14; B60L 11/182
USPC .......................................... 307/104
See application file for complete search history.

(56) References Cited

U.S. PATENT DOCUMENTS 9,853,487 B2 * 12/2017 Song .................. H02J 7/025
2013/0181797 A1 7/2013 Hickox
(Continued)

FOREIGN PATENT DOCUMENTS

| JP | 2008294385 | 12/2008 |
| JP | 2009004513 | 1/2009 |

(Continued)

OTHER PUBLICATIONS

International Search Report—PCT/KR2016/000167 dated Apr. 18, 2016.

*Primary Examiner* — Anh Q Tra
(74) *Attorney, Agent, or Firm* — Cantor Colburn LLP (57) ABSTRACT

Provided is a heat radiation unit for radiating heat generated during operation of a wireless power transmitting or receiving device and includes a plurality of thermally conductive metal layers stacked in two or more layers and an adhesive layer for attaching the thermally conductive metal layers, to prevent lowering of the charging efficiency and improve the heat radiation performance.

20 Claims, 5 Drawing Sheets

(51) Int. Cl.
  *H01F 38/00* (2006.01)
  *H01F 27/28* (2006.01)
  *H02J 50/00* (2016.01)
  *H02J 50/10* (2016.01)
  *B32B 7/12* (2006.01)
  *B32B 15/04* (2006.01)
  *H01F 27/36* (2006.01)
  *H01F 38/14* (2006.01)
  *H02J 7/02* (2016.01)
  *H01F 27/22* (2006.01)
  *H04B 5/00* (2006.01)

(52) U.S. Cl.
  CPC ........... *H01F 27/365* (2013.01); *H01F 38/14* (2013.01); *H02J 7/025* (2013.01); *H02J 50/00* (2016.02); *H02J 50/10* (2016.02); *H04B 5/0037* (2013.01); *H04B 5/0081* (2013.01); *B32B 2307/302* (2013.01); *B32B 2309/105* (2013.01)

(56) References Cited

U.S. PATENT DOCUMENTS

| 2014/0306653 A1* | 10/2014 | Hirobe | H01F 38/14 320/108 |
| 2014/0376191 A1* | 12/2014 | Hwang | F28F 13/003 361/720 |
| 2015/0102892 A1* | 4/2015 | Yeo | H01F 1/14716 336/200 |
| 2015/0123604 A1* | 5/2015 | Lee | H01F 38/14 320/108 |

FOREIGN PATENT DOCUMENTS

| KR | 20070080057 | 8/2007 | |
| KR | 20120050835 | 5/2012 | |
| KR | 101169661 | 8/2012 | |
| KR | 20130072181 | 7/2013 | |
| WO | WO 2013095036 A1 * | 6/2013 | ............. H01F 38/14 |

\* cited by examiner

HEAT RADIATION UNIT AND WIRELESS POWER TRANSMITTING AND RECEIVING DEVICE HAVING SAME

TECHNICAL FIELD

The present invention relates to heat radiation, and more particularly, to a heat radiation unit that dissipates heat generated during operation of a wireless power transmitting or receiving device that wirelessly charges a battery built in an electronic apparatus such as a smart phone or an electric vehicle, and a wireless power transmitting or receiving device having the same.

BACKGROUND ART

Generally, a portable terminal such as a cellular phone, a notebook computer, a portable digital assistant (PDA) or the like is equipped with a battery therein so that the portable terminal can be used while a user moves. Such a portable terminal requires a charger for charging the battery and the charger is connected to a general commercial power supply to supply a charging current to the battery of the portable terminal.

In order for the charger to provide the charging current to the battery of the portable terminal, the charging body constituting the charger and the battery of the portable terminal should be electrically connected.

Conventional chargers are connected to a portable terminal by wire and have connection terminals for wire connection. Therefore, when charging the battery of the portable terminal, the connection terminal of the portable terminal and the connection terminal of the charger should be connected to each other.

However, in the case of the connection terminal method described above, the terminals have different specifications and shapes depending on the devices, and thus the users may have to purchase new charging devices every time.

In order to solve this problem, a non-contact magnetic induction method, i.e., a wireless charging method has been devised. The wireless charger can be classified into a magnetic induction (MI) system (i.e., standard specification) and a magnetic resonance (MR) system (i.e., a standard specification). There may be a WPC (Wireless Power Consortium) system (i.e., a standard specification), and a PMA (Power Matrix Alliance) system (i.e., a standard specification), as two representative MI systems.

Korean Patent Publication No. 10-1169661 (published on Jul. 24, 2012) discloses a wireless power receiver. The wireless power receiver is disposed adjacent to an external charge transmitter equipped with a primary coil in a non-contact manner so that a battery is charged. The wireless power receiver includes: a main body; a secondary coil connected to the main body and a battery, and which generates an induced electromotive force by an induced magnetic field generated in the primary coil; a receiving ferrite member that is disposed in a rear surface of the secondary coil so that the induced magnetic field is well induced in the secondary coil; and a magnetic shield that is disposed on a rear surface of the receiving ferrite member and that blocks the induced magnetic field from being emitted in the battery direction, wherein the magnetic shield is made of a flexible material of a light weight in which a PET film and an amorphous tape are laminated, and a heat radiation sheet is provided on a rear surface of the magnetic shield, to radiate heat generated in the secondary coil.

The heat radiation sheet is formed of a heat radiation metal plate for diffusing heat generated in the secondary coil. Such a heat radiation metal plate plays a role of heat dissipation, but eddy current is generated in the heat radiation metal plate itself, which causes a decrease in charging efficiency due to eddy current loss.

The eddy current is generated when an alternating magnetic field generated in the secondary coil is induced in the inside of the metal plate which is a conductor by the electromagnetic induction to cause an eddy current loss, and Eddy Current Loss (Pe) can be expressed by the following equation (1):

$$p_e = k_e (B_{max} tf)^2 \qquad \text{[Equation 1]}$$

where Ke denotes a material constant, $B_{max}$ denotes the maximum magnetic flux density, t denotes thickness, and f denotes frequency.

As shown in Equation 1, the eddy current loss Pe is proportional to the square of the thickness t of the heat radiation metal plate.

Therefore, if the thickness of the heat radiation metal plate is made thin, it is possible to reduce the eddy current loss, but there is a problem that the heat radiation area is reduced and the heat radiation performance is lowered. If the thickness of the heat radiation metal plate is made thick, the heat radiation performance is improved, but the charging efficiency is lowered because the eddy current loss is caused in proportion to the square of the thickness of the heat radiation metal plate.

The currently available heat radiation metal plate is manufactured to a thickness that can be lowered to a set temperature because it needs to perform the heat radiation function required by a wireless power device. Therefore, the currently available heat radiation metal plate has a problem that an eddy current loss is generated, thereby deteriorating the charging efficiency.

DISCLOSURE

Technical Problem

Accordingly, it is an object of the present invention to provide a heat radiation unit and a wireless power transmitting or receiving device which can prevent deterioration of charging efficiency while improving heat radiation performance.

Technical Solution

To achieve the above-described object of the invention, according to an aspect of the present invention, there is provided a heat radiation unit comprising: a plurality of thermally conductive metal layers stacked in two or more layers; and at least one adhesive layer for attaching between the plurality of the thermally conductive metal layers.

According to this structure, since a plurality of thin thermally conductive metal layers are laminated to constitute the heat radiation unit, it is possible to reduce an eddy current loss caused by a thickness factor, and thus to improve the charging efficiency and suppress heat generation.

The plurality of thermally conductive metal layers may be formed of Cu, Ag, Ni, Al, or an alloy thereof.

The plurality of thermally conductive metal layers may be formed to have an identical thickness.

The adhesive layer may be formed of an adhesive layer containing a thermally conductive material.

The thermally conductive material may comprise any one of a thermally conductive metal powder, a thermally conductive carbon, a thermally conductive carbon black, a carbon nanotube (CNT), and a conductive polymer (PDOT).

According to another aspect of the present invention, there is also provided a wireless power transmitting device or a wireless power receiving device having the above-mentioned heat radiation unit.

Here, the wireless power transmitting device may comprise: a wireless power transmission coil; a shielding unit for shielding a magnetic field generated in the wireless power transmission coil; and a heat radiation unit for radiating heat generated in the wireless power transmission coil.

In addition, the wireless power receiving device may comprise: a wireless power reception coil; a shielding unit for shielding a magnetic field generated in the wireless power reception coil; and a heat radiation unit for radiating heat generated in the wireless power reception coil.

The shielding unit and the heat radiation unit may be mutually laminated by a second adhesive layer to then be integrally formed.

The shielding unit may comprise a first shielding sheet and a second shielding sheet in which different magnetic sheets having different resistivities are stacked.

The first shielding sheet may employ a ribbon sheet of an amorphous alloy or a ribbon sheet of a nanocrystalline alloy.

The second shielding sheet may employ a ferrite sheet or a polymer sheet made of a magnetic powder and a resin.

The ferrite sheet may employ Ni—Zn ferrite or Mn—Zn ferrite.

The first shielding sheet may have a thickness of 20 μm to 300 μm, and the second shielding sheet may have a thickness of 30 μm to 500 μm.

The first shielding sheet and the second shielding sheet may be attached by a third adhesive layer, and a protective cover may be laminated on one surface of the first shielding sheet by a fourth adhesive layer.

The first shielding sheet and the second shielding sheet may be formed into a plurality of minute pieces, in a separate form, respectively.

Advantageous Effects

Since the heat radiation unit according to the present invention is formed by stacking a plurality of thin thermally conductive metal layers to constitute a heat radiation unit, it is possible to reduce an eddy current loss caused by a thickness factor, thereby improving the charging efficiency and suppressing heat generation.

BEST MODE

Hereinafter, embodiments of the present invention will be described in detail with reference to the accompanying drawings. The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

Figure 1:
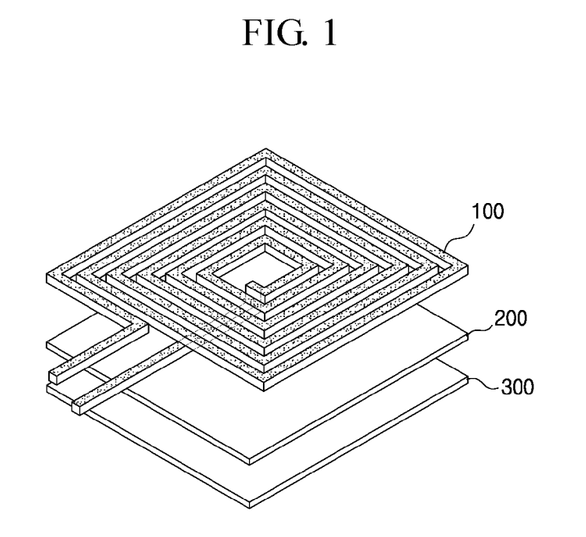
FIG. 1 is a configuration diagram of a wireless power transmitting device according to an embodiment of the present invention.

Referring to FIG. 1, a wireless power transmitting device according to an embodiment of the present invention includes: a wireless power transmission coil 100 for charging a battery of an electronic apparatus by a magnetic induction method; a shielding unit 200 that is disposed on one surface of the wireless power transmission coil 100 and shields a magnetic field generated by the wireless power transmission coil 100; and a heat radiation unit 300 for radiating heat generated in the wireless power transmission coil 100.

A wireless power transmitting device according to an exemplary embodiment of the present invention includes a circuit unit (not shown) that applies power for wireless transmission to a wireless power transmission coil 100 with high efficiency using commercial AC power.

Figure 2:
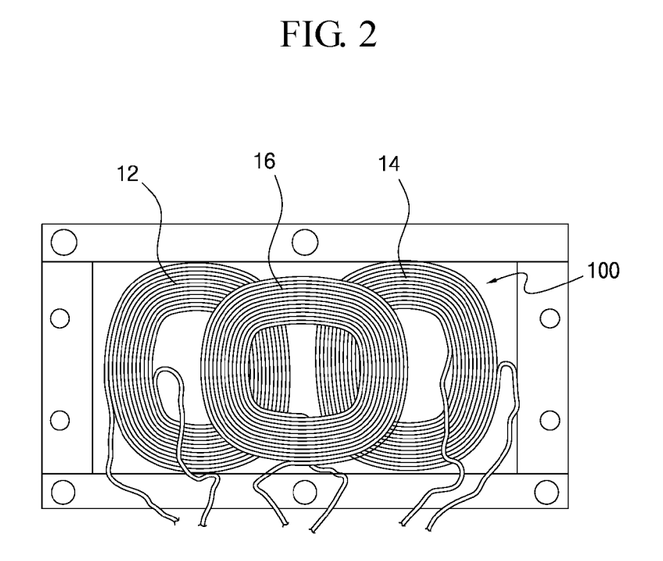
FIG. 2 is a top view of a wireless power transmission coil of a wireless power transmitting device according to an embodiment of the present invention.

The wireless power transmitting device according to the embodiment of the present invention satisfies a wireless power consortium (WPC) standard A6 type wireless power system. As shown in FIG. 2, the wireless power transmission coil 10 according to the embodiment of the present invention includes three coils 12, 14, and 16 to satisfy a wireless power consortium (WPC) standard A6 type wireless power system, in which the first coil 12 and the second coil 14 are arranged horizontally and the third coil 16 is stacked on the first coil 12 and the second coil 14.

The wireless power transmission coil 100 may have one, two, or three or more coils stacked in addition to the three-coil structure.

Figure 3:
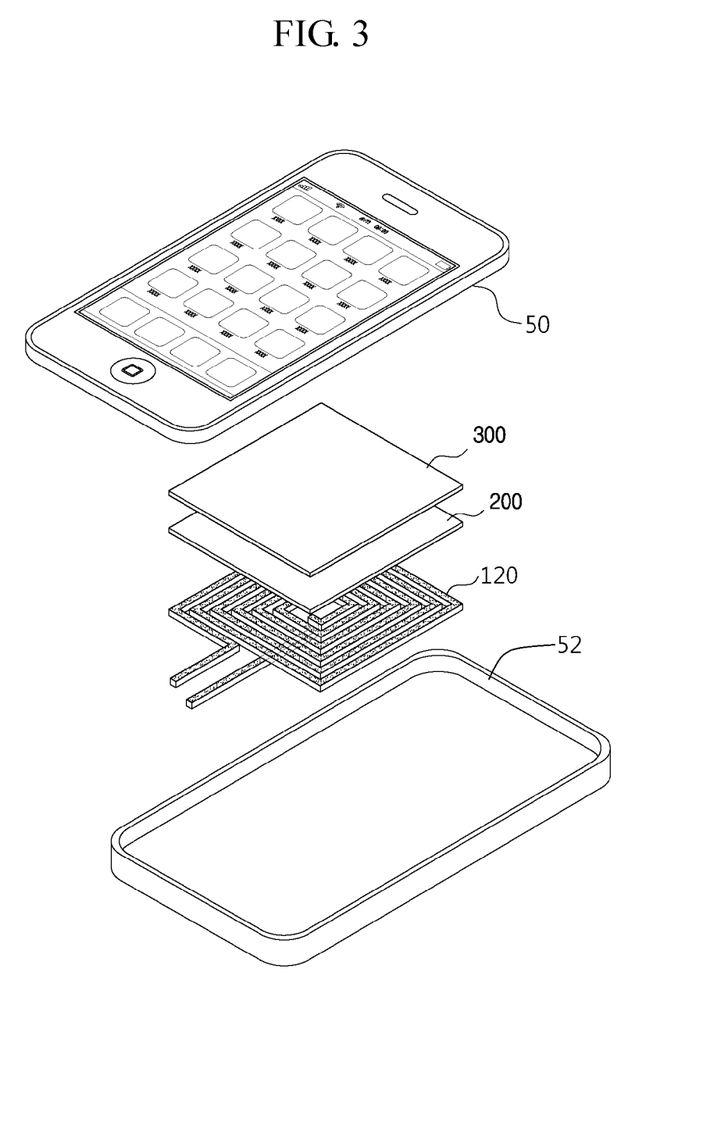
FIG. 3 is a configuration diagram of a wireless power receiving device according to an embodiment of the present invention.

Referring to FIG. 3, a wireless power receiving device according to an embodiment of the present invention is disposed to face the wireless power transmitting device, and is electrically connected to a battery built in a main body 50, which includes: a wireless power reception coil 120 for charging the battery by a magnetic induction method; a shielding unit 200 disposed on an upper side of the wireless power reception coil 120 to shield a magnetic field generated in the wireless power reception coil 120; and a heat radiation unit 300 for radiating heat generated in the wireless power reception coil 120.

The wireless power receiving device including the wireless power reception coil 120, the shielding unit 200 and the heat radiation unit 300 may be installed in a battery cover 52 when being installed in the apparatus main body 50. In addition to the structure in which the wireless power receiving device is directly installed in the apparatus main body 50, the wireless power receiving device may be installed in a separate case mounted on the apparatus main body 50.

The wireless power reception coil 120 generates an induced electromotive force by an induced magnetic field generated in the wireless power transmission coil 100 of the wireless power transmitting device to thus charge the battery.

Figure 4:
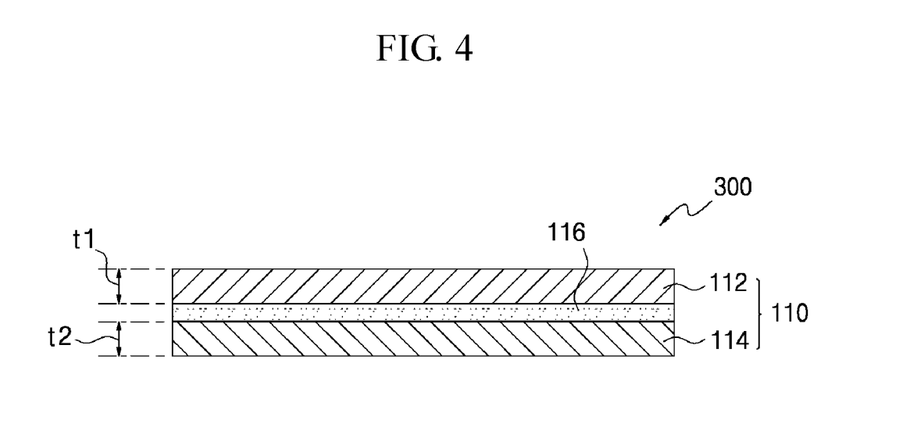
FIG. 4 is a cross-sectional view of a heat radiation unit according to an embodiment of the present invention.

As shown in FIG. 4, the heat radiation unit 300 according to an embodiment includes two thermally conductive metal layers 110 stacked thereon, and an adhesive layer 116 attached between the thermally conductive metal layers 110, and mutually adhering to the thermally conductive metal layers 110.

The heat radiation unit 300 may be applied to at least one of a heat radiation unit of the wireless power transmitting device and a heat radiation unit of the wireless power receiving device.

A thermally conductive metal plate of excellent thermal conductivity such as Al, Ni, Cu, or Ag may be used as the thermally conductive metal layer 110.

An adhesive tape containing a thermally conductive material may be used as the adhesive layer 116. Here, the thermally conductive material includes any one of a thermally conductive metal such as Ni, Cu, and Ag having an excellent thermal conductivity, a conductive carbon, a conductive carbon black, a carbon nanotube (CNT), and a conductive polymer (PDOT). Any material can be used as long as the material has thermal conductivity.

The metal plate for heat radiation radiates heat generated by the wireless power transmission coil to perform the heat radiation function, but an eddy current is caused in the metal plate to thus reduce the charging efficiency. That is, the thinner the thickness of the heat radiation metal plate, the less the eddy current loss, but the thinner the thickness of the heat radiation metal plate, the lower the heat radiation performance.

Accordingly, in some embodiments of the present invention, a plurality of thin metal plates having the same thickness as a single-layered heat radiation metal plate required to lower the heat generating temperature of the heat generating element by a predetermined temperature are laminated, to minimize an eddy current loss, and to keep heat radiation performance identically.

Table 1 below shows the change in the heat radiation performance and the charging efficiency when the heat radiation metal plate is divided into two or three with the same thickness while maintaining the same overall thickness.

TABLE 1

| | Thickness (µm) | Charging efficiency | Heat radiation performance |
|---|---|---|---|
| One metal plate | 30 | lowered by 2.0% | −5° C. |
| Two metal plates | 30 | lowered by 1.0% | −5° C. |
| Three metal plates | 30 | lowered by 0.5% | −5° C. |

As shown in Table 1, the heat radiation performance is relatively good at −5° C. when one metal plate is used, but the charging efficiency is lowered by 2.0% because the eddy current loss is proportional to the square of the thickness of the metal plate ($t^2$).

The two metal plates have the same thickness as one metal plate by stacking two metal plates having a thickness of 15 µm, so that the heat radiation performance is the same as that of one metal plate. However, in the case of using two metal plates, the eddy current loss is reduced to ½ of that in the case of using one metal plate. Therefore, the charging efficiency is reduced by 0.5% in each of the two metal plates, and is lowered by only 1.0% finally.

As described above, when two metal plates are stacked, the same heat radiation performance can be obtained compared to when one metal plate is used, but the charging efficiency can be lowered by about 50%, compared to when one metal plate is used.

In addition, the three metal plates have the same thickness as one metal plate by stacking three metal plates having a thickness of 10 µm, so that the heat radiation performance is the same as that of one metal plate. However, since the eddy current loss is proportional to the square of the thickness of each of the three metal plates, the eddy current loss is reduced to one third in the structure in which the three metal plates are laminated. Therefore, the charging efficiency is reduced in each of the two metal plates, and is lowered by only 0.5% finally.

As described above, as the number of the metal plates is increased, the lowering of the charging efficiency can be lowered while the heat radiation performance is maintained.

As shown in FIG. 4, the heat radiation unit 300 according to one embodiment includes: a first thermally conductive metal layer 112; a second thermally conductive metal layer 114 stacked on the first thermally conductive metal layer 112; and an adhesive layer 116 laminated between the first thermally conductive metal layer 112 and the second thermally conductive metal layer 114 and laminating the two thermally conductive metal layers 112 and 114.

The first thermally conductive metal layer 112 and the second thermally conductive metal layer 114 are formed to have the same thickness and may be formed of the same metal material having excellent thermal conductivity or may be formed of different kinds of different metal materials.

Figure 5:
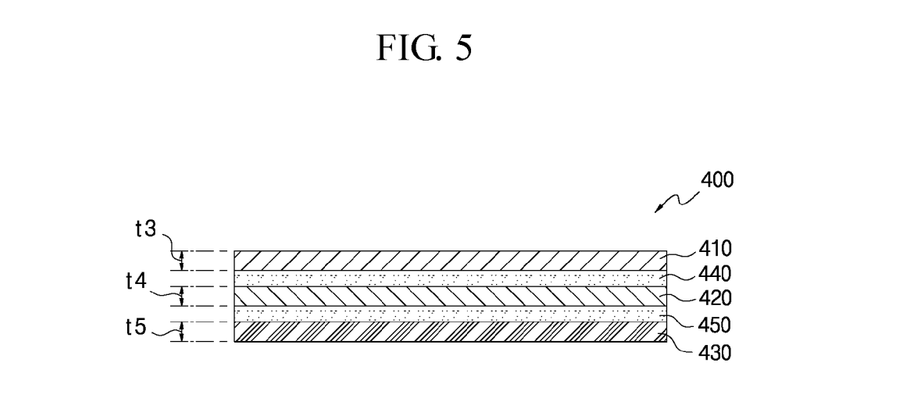
FIG. 5 is a cross-sectional view of a heat radiation unit according to another embodiment of the present invention.

As shown in FIG. 5, a heat radiation unit 400 according to another embodiment includes: a first thermally conductive metal layer 410, a second thermally conductive metal layer 420 laminated on the first thermally conductive metal layer 410, a third thermally conductive metal layer 430 laminated on the second thermally conductive metal layer 420, a first adhesive layer 440 attached between the first thermally conductive metal layer 410 and the second thermally conductive metal layer 420, and a second adhesive layer 450 attached between the second thermally conductive metal layer 420 and the third thermally conductive metal layer 430.

The total sum of the thickness t2 of the first thermally conductive metal layer 112 and the thickness t1 of the second thermally conductive metal layer 114 according to one embodiment may be the same as the total sum of the thickness t3 of the first thermally conductive metal layer 410, the thickness t4 of the second thermally conductive metal layer 420, and the thickness t5 of the third thermally conductive metal layer 430 according to another embodiment.

That is, the thickness of the two metal layers and the thickness of the three metal layers are the same, so that the three metal layers are improved in charging efficiency compared to the two metal layers while exhibiting the same heat radiation performance.

It is also possible to use four or more thermally conductive metal layers stacked as the heat radiation unit according to the field of use.

As described above, the heat radiating unit according to the embodiment of the present invention is formed by laminating a plurality of the thermally conductive metal layers, thereby minimizing the eddy current loss to thus improve the heat radiation performance while preventing the deterioration of the charging efficiency.

Figure 6:
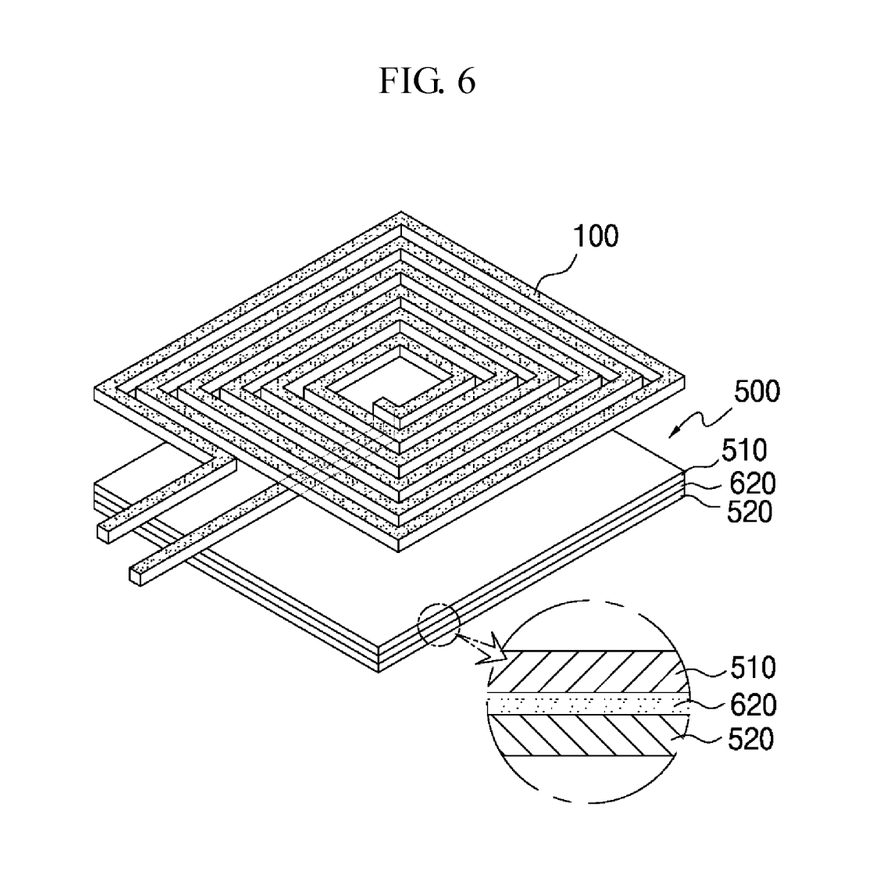
FIG. 6 is a configuration diagram of a wireless power transmitting device according to another embodiment of the present invention.

As shown in FIG. 6, a wireless power transmitting device according to another embodiment includes: a wireless power transmission coil 100 for charging a battery in an electronic apparatus by a magnetic induction method, and a composite unit 500 for simultaneously performing a function of shielding a magnetic field generated in the wireless power transmission coil 100 and a function of radiating heat generated in the wireless power transmission coil 100, in which the composite unit 500 is disposed so as to be laminated on the wireless power transmission coil 100.

Figure 7:
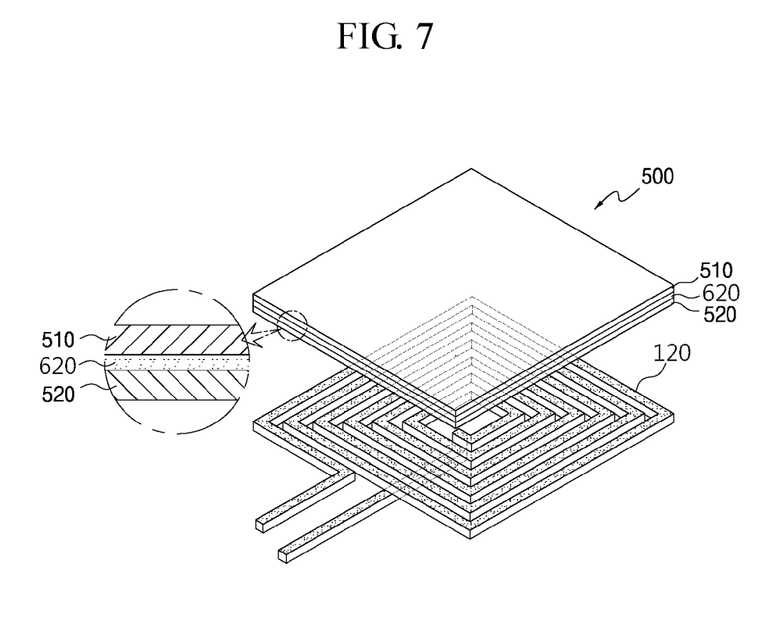
FIG. 7 is a configuration diagram of a wireless power receiving device according to another embodiment of the present invention.

As shown in FIG. 7, a wireless power receiving device according to another embodiment includes: a wireless power reception coil 120 for charging a battery in an electronic apparatus by a magnetic induction method, and a composite unit 500 for simultaneously performing a function of shielding a magnetic field generated in the wireless power reception coil 120 and a function of radiating heat generated in the wireless power reception coil 120, in which the composite unit 500 is disposed so as to be laminated on the wireless power reception coil 120.

Figure 8:
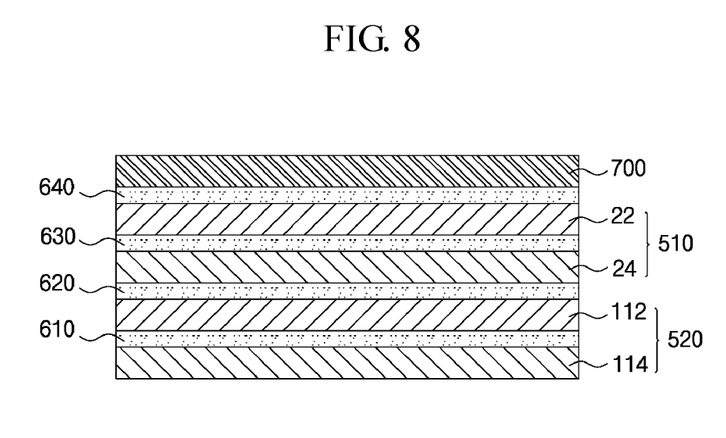
FIG. 8 is a cross-sectional view of a composite unit according to the present invention.

As shown in FIG. 8, the complex unit 500 includes the shielding unit 510 for shielding a magnetic field generated in the wireless power transmission coil 100 or the wireless power reception coil 120, the heat radiation unit 520 for radiating heat generated in the wireless power transmission coil 100 or the wireless power reception coil 120, and a second adhesive layer 620 for bonding the shielding unit 510 and the heat radiation unit 520 to each other.

As described above, in the composite unit 500, the shielding unit 510 and the heat radiation unit 520 are integrally formed by being joined together by the second adhesive layer 620.

The heat radiation unit 520 is formed of a plurality of thermally conductive metal layers 112 and 114 and the first adhesive layer 610 is provided between the thermally conductive metal layers 112 and 114 to bond the thermally conductive metal layers 112 and 114 together.

The heat radiation unit 520 has the same structure as the heat radiation unit 300 described in the above embodiment.

The shielding unit 510 may be formed of one shielding sheet having permeability characteristics, or and may be formed by stacking a plurality of shielding sheets having different permeabilities.

Specifically, the shielding unit 510 includes a first shielding sheet 22 having a high permeability, and a second shielding sheet 24 which is stacked on the first shielding sheet 22 and has a relatively high resistivity relative to the first shielding sheet 22.

The first shielding sheet 22 and the second shielding sheet 24 are attached by a third adhesive layer 630.

As the shielding sheet, Mn—Zn ferrite which is generally a thin film and is produced by a press sintering method (or a pressing method) but has a relatively high magnetic permeability is used alone. Mn—Zn ferrite is formed by molding a ferrite powder through a high-pressure pressing process to then be sintered and grinded to a desired thickness. Therefore, there is a problem that the manufacturing process is complicated and mass production is difficult.

In addition, since Mn—Zn ferrite is manufactured by the press sintering method (or a pressing method), it is difficult to produce the Mn—Zn ferrite so as to form a thin film having a thickness of less than 500 µm. Further, since Mn—Zn ferrite is strong in brittleness and tends to be broken by external impact, there is a problem that it is difficult to use at places where a shock is applied from the outside such as a wireless power transmitting device and a wireless power receiving device. When the Mn—Zn ferrite used as the shielding sheet is broken by the impact, the permeability is changed, which affects the inductance of the wireless power transmitting or receiving coil constituting the antenna for transmitting or receiving the wireless power.

For example, Ni—Zn ferrite or an amorphous alloy ribbon sheet may be used as the shielding sheet instead of Mn—Zn ferrite. Since Ni—Zn ferrite has low permeability, the thickness of Ni—Zn ferrite should be at least twice as thick as that of Mn—Zn ferrite in order to achieve the same permeability characteristics as Mn—Zn ferrite. Meanwhile, the ribbon sheet of the amorphous alloy has a permeability characteristic comparable to Mn—Zn ferrite in a thin film, but has a problem that heat is generated due to a large amount of an eddy current loss.

Accordingly, the present invention aims to solve this problem by using a plurality of shielding sheets laminated in a hybrid type comprising magnetic sheets which are thin films and different from each other so as to increase the magnetic permeability and reduce the eddy current loss.

The first shielding sheet 22 may use a shielding sheet having a relatively high magnetic permeability relative to the second shielding sheet 24 and the second shielding sheet 24 may use a magnetic substance having a relatively higher resistivity than the first shielding sheet 22, to reduce an eddy current loss.

The first shielding sheet 22 is formed of a ribbon sheet of an amorphous alloy or a nanocrystalline alloy having a high permeability while being a thin film, and is preferably used in a form separated into a plurality of microstructures so as to suppress eddy current generation.

The second shielding sheet 24 may use a shielding sheet having a relatively low permeability as compared with the first shielding sheet 22. For example, a ferrite sheet, a polymer sheet, or the like may be used as the second shielding sheet 24. Specifically, Ni—Zn ferrite or Mn—Zn ferrite may be used as the second shielding sheet 24. The second shielding sheet 24 is preferably used in a form separated into a plurality of microstructures so as to suppress eddy current generation, like the first shielding sheet 22.

Therefore, when the first shielding sheet 22 and the second shielding sheet 24 are stacked, the magnetic field is primarily shielded by the second shielding sheet 24 having a large surface resistance. Accordingly, a hybrid sheet having a high permeability due to the use of a thin film amorphous alloy ribbon sheet or a nanocrystalline alloy ribbon sheet can be obtained without causing a large eddy current loss in the first shielding sheet 22.

Here, instead of the ferrite sheet, the second shielding sheet 24 may use a polymer sheet made of a magnetic powder and a resin having high magnetic permeability such as an amorphous alloy powder, a soft magnetic body powder, or Sendust®.

In this case, the amorphous alloy powder may preferably use, an amorphous alloy powder including, for example, one or more of an amorphous alloy having a composition selected from the group consisting of Fe—Si—B, Fe—Si—B—Cu—Nb, Fe—Zr—B and Co—Fe—Si—B.

Since the polymer sheet is made of a magnetic powder and a resin, eddy current loss is small, and magnetic permeability is relatively low like a ferrite sheet. However, when a magnetic field generated from a charging coil is emitted, the magnetic field is greatly attenuated while passing through the polymer sheet, thereby minimizing the occurrence of eddy current loss in the first shielding sheet 22 of the amorphous ribbon sheet laminated on one side of the polymer sheet.

A protective film 700 having a fourth adhesive layer 640 is laminated on one surface of the first shielding sheet 22.

Here, preferably, the first shielding sheet 22 is divided into a plurality of pieces, and gaps between the pieces are filled with a part of the adhesive forming the third adhesive layer 630 and the fourth adhesive layer 640. Therefore, since the first shielding sheet 22 has a shape in which the gaps between the plurality of minute pieces are partially surrounded by the adhesive, the first shielding sheet 22 can also be used in the wireless power device installed in a place where external impact is generated, such as a wireless power device installed in a car.

The protective film 700 may be formed of a fluororesin-based film, or the like, such as, for example, a polyethylene terephthalate (PET) film, a polyimide film, a polyester film, a polyphenylene sulfide (PPS) film, a polypropylene film, or a polyterephthalate (PTFE), and is attached to one surface of the first shielding sheet 22 through the first adhesive layer 42.

The first to fourth adhesive layers 610, 620, 630, and 640 may be formed of a conductive adhesive, and an insulating adhesive may be also used as the first to fourth adhesive layers 610, 620, 630, and 640. For example, an acrylic adhesive may be used as the first to fourth adhesive layers 610, 620, 630, and 640 and other adhesives may also be used thereas.

As described above, the complex unit 500 according to the embodiment of the present invention can simultaneously perform the magnetic shielding function and the heat radiation function, and the heat radiation unit 520 is formed by stacking a plurality of thermally conductive metal layers, to thereby prevent degradation of charging efficiency due to the eddy current loss, and the shielding unit 510 is formed by laminating different types of the first shielding sheet 22 and the second shielding sheet 24 having different magnetic permeabilities, thereby increasing the permeability and reducing the eddy current loss, thus improving the charging efficiency.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

What is claimed is:

1. A heat radiation unit that radiates heat generated during an operation of a wireless power transmitting device, the heat radiation unit comprising:
    two or more thermal conductive metal layers; and
    an adhesive layer for attaching two neighboring thermal conductive metal layers to each other,
    wherein each of the two or more thermal conductive metal layers has a thickness in such a way that a total eddy current loss occurring in the two or more conductive metal layers is smaller than that of a single thermal conductive metal layer corresponding a total thickness of the two or more thermal conductive metal layers, thereby minimizing loss of charging efficiency by an eddy current loss while maintaining heat radiation performance thereof.

2. The heat radiation unit of claim 1, wherein the two or more thermal conductive metal layers are formed of Cu, Ag, Ni, Al, or an alloy thereof.

3. The heat radiation unit of claim 1, wherein the two or more thermal conductive metal layers have an identical thickness to each other.

4. The heat radiation unit of claim 1, wherein the adhesive layer contains a thermally conductive material.

5. The heat radiation unit of claim 4, wherein the thermally conductive material comprises any one of a thermally conductive metal powder, a thermally conductive carbon, a thermally conductive carbon black, a carbon nanotube (CNT), and a conductive polymer (PDOT).

6. A wireless power transmitting device comprising:
    a wireless power transmission coil;
    a shielding unit for shielding a magnetic field generated in the wireless power transmission coil; and
    the heat radiation unit according to claim 1, for radiating heat generated in the wireless power transmission coil.

7. The wireless power transmitting device of claim 6, wherein the shielding unit and the heat radiation unit are laminated on each other by a second adhesive layer.

8. The wireless power transmitting device of claim 6, wherein the shielding unit comprises a first shielding sheet and a second shielding sheet having a magnetic permeability different from that of the first shielding sheet.

9. The wireless power transmitting device of claim 8, wherein the first shielding sheet employs a ribbon sheet of an amorphous alloy or a ribbon sheet of a nanocrystalline alloy.

10. The wireless power transmitting device of claim 8, wherein the second shielding sheet employs a ferrite sheet or a polymer sheet.

11. The wireless power transmitting device of claim 10, wherein the ferrite sheet employs Ni—Zn ferrite or Mn—Zn ferrite.

12. The wireless power transmitting device of claim 8, wherein the first shielding sheet has a thickness of 20 µm to 300 µm, and the second shielding sheet has a thickness of 30 µm to 500 µm.

13. The wireless power transmitting device of claim 8, wherein the first shielding sheet and the second shielding sheet are attached to each other by a third adhesive layer, and a protective cover is laminated on one surface of the first shielding sheet by a fourth adhesive layer.

14. The wireless power transmitting device of claim 8, wherein the first shielding sheet and the second shielding sheet are formed into a plurality of minute pieces, in a separate form, respectively.

15. A wireless power receiving device comprising:
    a wireless power reception coil;
    a shielding unit for shielding a magnetic field generated in the wireless power reception coil; and
    a heat radiation unit according to claim 1, for radiating heat generated in the wireless power reception coil.

16. The wireless power receiving device of claim 15, wherein the shielding unit and the heat radiation unit are laminated on each other by a second adhesive layer.

17. The wireless power receiving device of claim 15, wherein the shielding unit comprises a first shielding sheet and a second shielding sheet having a magnetic permeability different from that of the first shielding sheet.

18. The wireless power receiving device of claim 17, wherein the first shielding sheet employs a ribbon sheet of an amorphous alloy or a ribbon sheet of a nanocrystalline alloy.

19. The wireless power receiving device of claim 17, wherein the second shielding sheet employs a ferrite sheet or a polymer sheet.

20. The wireless power receiving device of claim 17, wherein the first shielding sheet has a thickness of 20 μm to 300 μm, and the second shielding sheet has a thickness of 30 μm to 500 μm, and wherein the first shielding sheet and the second shielding sheet are formed into a plurality of minute pieces, in a separate form, respectively.

\* \* \* \* \*